United States Patent Office.

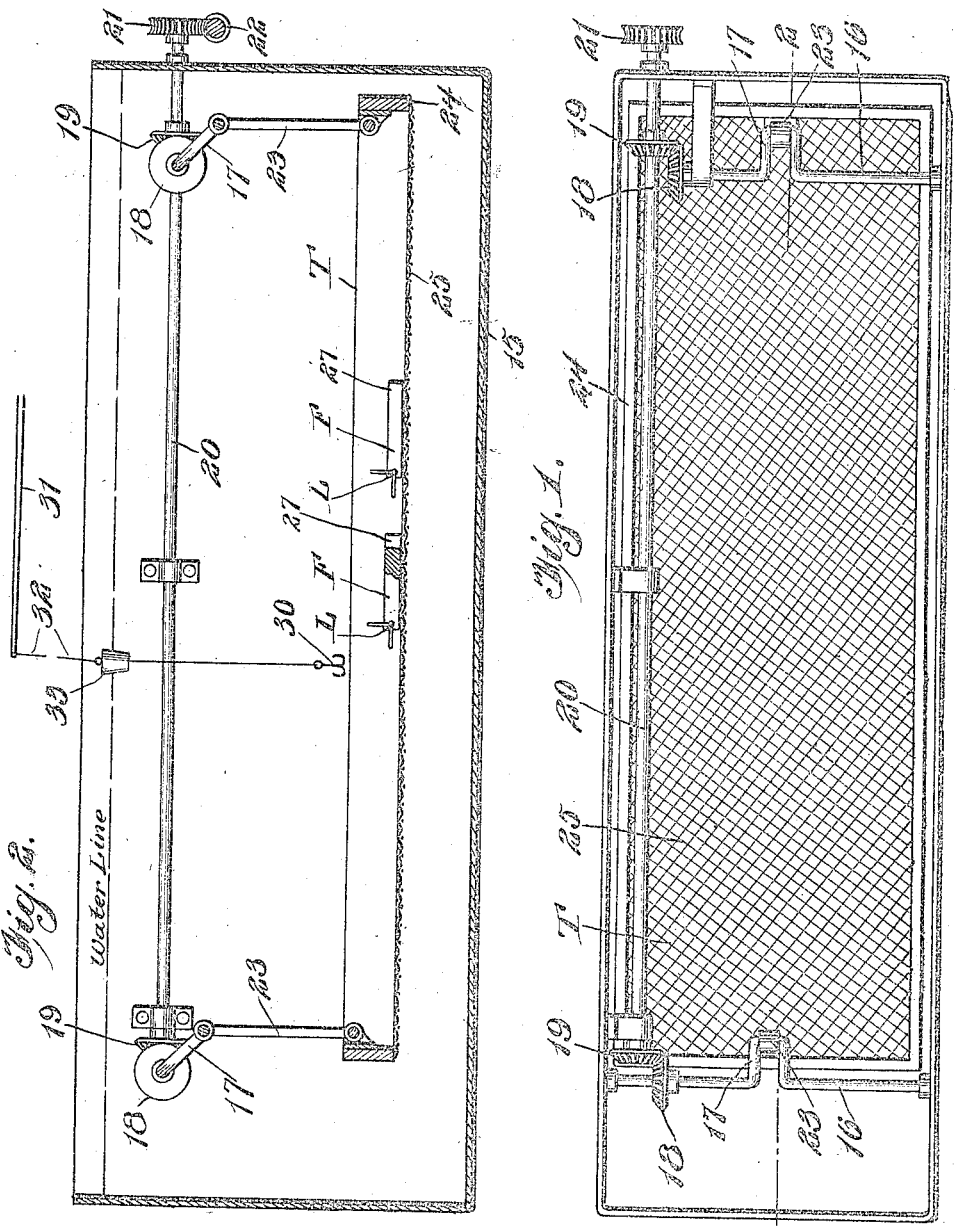

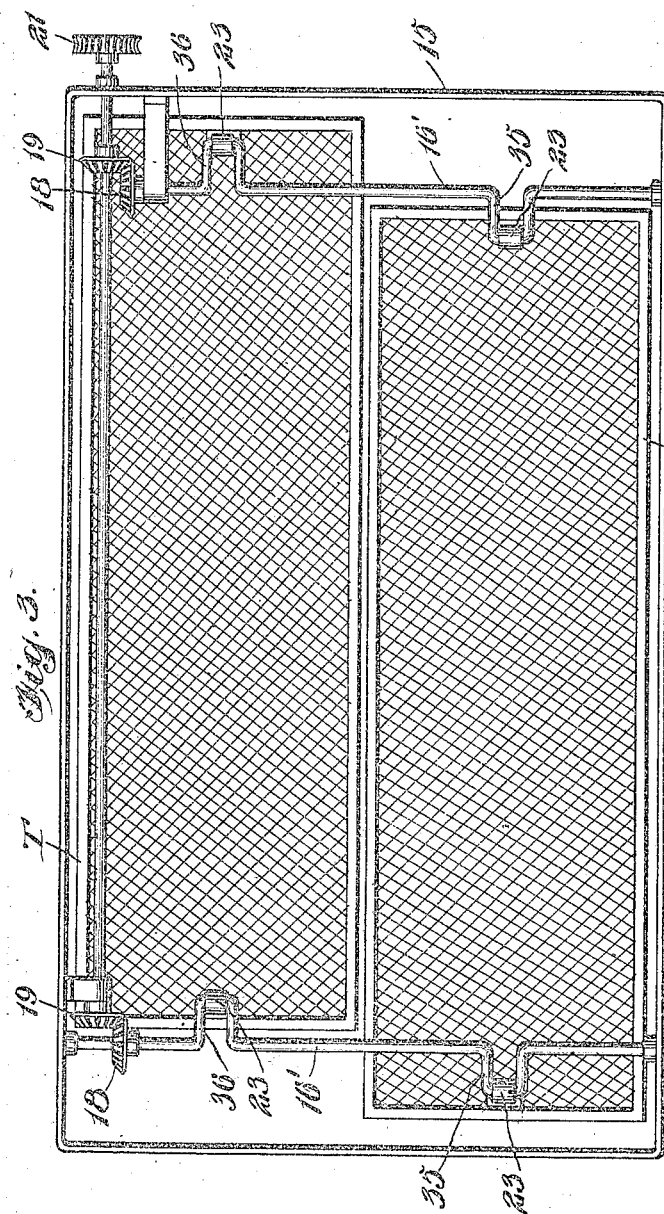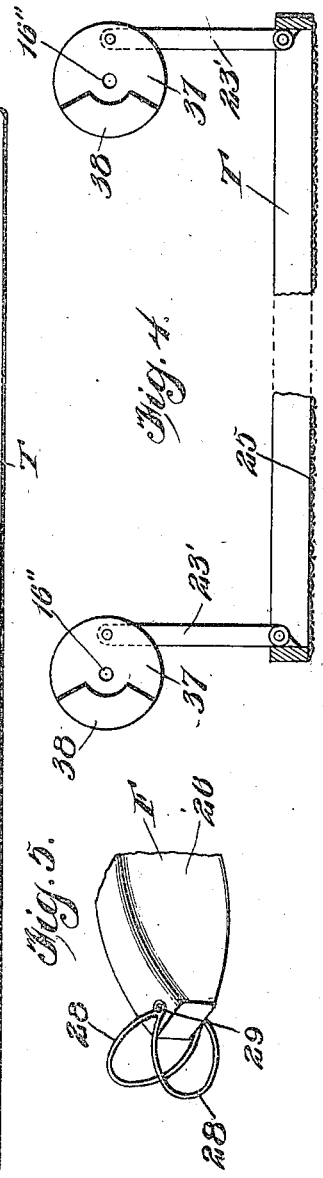

BUREN MOAD, OF PATTONSBURG, MISSOURI.

GAME.

1,162,637.　　　Specification of Letters Patent.　　Patented Nov. 30, 1915.

Application filed November 11, 1914. Serial No. 871,544.

*To all whom it may concern:*

Be it known that I, BUREN MOAD, a citizen of the United States, residing at Pattonsburg, in the county of Daviess and State of Missouri, have invented new and useful Improvements in Games, of which the following is a specification.

This invention relates to games and amusement devices and particularly to a form of amusement which resembles fishing.

The invention has for its object to produce a device of this class in which a tray is supported for orbital movement within a tank containing water, said tray serving to support fishes which are equipped with loops to be engaged by hooks suspended above and supported by floats or corks, which latter, when a fish is caught on a hook, will be drawn under water, thereby serving to indicate the catch when the hook with the fish may be withdrawn.

A further object of the invention is to simplify and improve the general construction and operation of the apparatus.

A further object of the invention is to produce a fish image having pivotally mounted double loops so arranged that one loop will always be presented in an upward direction, irrespective of which side the fish is turned upward.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a device constructed in accordance with the invention. Fig. 2 is a sectional view taken on the line 2—2 in Fig. 1. Fig. 3 is a top plan view illustrating a modification. Fig. 4 is a detail view in sectional elevation illustrating a modification. Fig. 5 is a perspective detail view of one of the fishes.

Corresponding parts in the several figures are denoted by like characters of reference.

A tank 15 of proper capacity and preferably of rectangular shape is provided adjacent to the ends thereof with shafts 16 supported for rotation, each of said shafts having a crank 17. Said shafts 16 are also provided with bevel gears 18 meshing with bevel gears 19 on a longitudinally disposed countershaft 20 which may be driven in any convenient manner from a suitable source of power. In the drawing transmission means have been shown including a worm gear 21 on the shaft 20 and a worm 22 meshing with said gear. Suspended within the tank by means of rods 23, and pivoted on the cranks 17 is a tray T consisting of a frame 24 covered with foraminous material, such as wire netting 25. Said tray serves to support a plurality of fishes F made preferably of metal or other heavy material, each fish consisting of a flat body 26 having at one end a bifurcated tail portion 27 and provided at the other end with a pivotally supported loop member L composed practically of two U-shaped loops 28 disposed substantially at right angles to one another and having pivotal connection with the member 26 at the intersection of their respective limbs by means of a pivot member 29. The side edges of the fish are preferably slightly beveled so that when a fish is thrown upon the screen there will be no possibility or likelihood of its standing on edge; and it will be seen that no matter which side of the body portion of the fish is thrown uppermost, one of the loops 28 will rest on the screen, while the other loop will be presented substantially in an upright direction.

For the purpose of catching the fishes hooks 30 are provided, said hooks being suspended from a pole 31 by means of a line 32 having a float 33.

In the operation of the device, the rotation of the shafts 16 will impart an orbital movement to the tray T within the tank, which latter is partly filled with water. The hook 30 is supported in the path of the fishes and may be guided by the pole 31 so as to cause the hook to engage the upstanding loop 28 connected with any one of the fishes. When engagement takes place and the tank recedes in a downward direction, the weight of the fish will cause the float 33 to be pulled below the surface of the water, thereby indicating a "bite" and notifying the operator to withdraw the hook with the fish. The latter when detached from the hook may be simply thrown back into the tank where it will light on the tray in position for a repetition of the operation.

In Fig. 3 of the drawings has been illustrated a modification under which the tank is made sufficiently wide to contain two trays, said trays being connected with diametrically opposite cranks 35, 36 of the shafts which re here designated 16'. The two trays will counterbalance each other, thereby facilitating the operation.

In Fig. 4 has been shown a modification under which the shafts, here designated 16'', in place of cranks are provided with disks 37 with which the rods 23' supporting the tray are connected, said disks being provided with counterweights 38.

From the foregoing description, taken in connection with the drawings hereto annexed, the operation and advantages of this invention will be readily understood. It provides a simple and effective amusement device whereby fishing will be simulated in a life-like manner, and in which submerging of the float will indicate when a bite is had.

Having thus described the invention, what is claimed as new, is:—

1. In a device of the class described, a tank, a tray supported for orbital movement therein, means for moving the tray and an object supported on said tray, said object consisting of a flat body and a double loop pivotally connected therewith.

2. In an amusement device of the class described, a tank, a tray supported for orbital movement therein, means for moving the tray and an object supported on the tray, said object consisting of a flat body of heavy material having beveled side edges and provided at one end with a pivot member, and a loop member supported thereon, said loop member comprising two substantially U-shaped loops positioned substantially at right angles to one another.

In testimony whereof I affix my signature in presence of two witnesses.

BUREN MOAD.

Witnesses:
 WM. T. MOAD,
 JAS. D. CREASON.